Nov. 19, 1963  H. RUEHL  3,111,327
EXPANSIBLE AND CONTRACTIBLE WORK PIECE HOLDER
Filed July 6, 1961  2 Sheets-Sheet 1
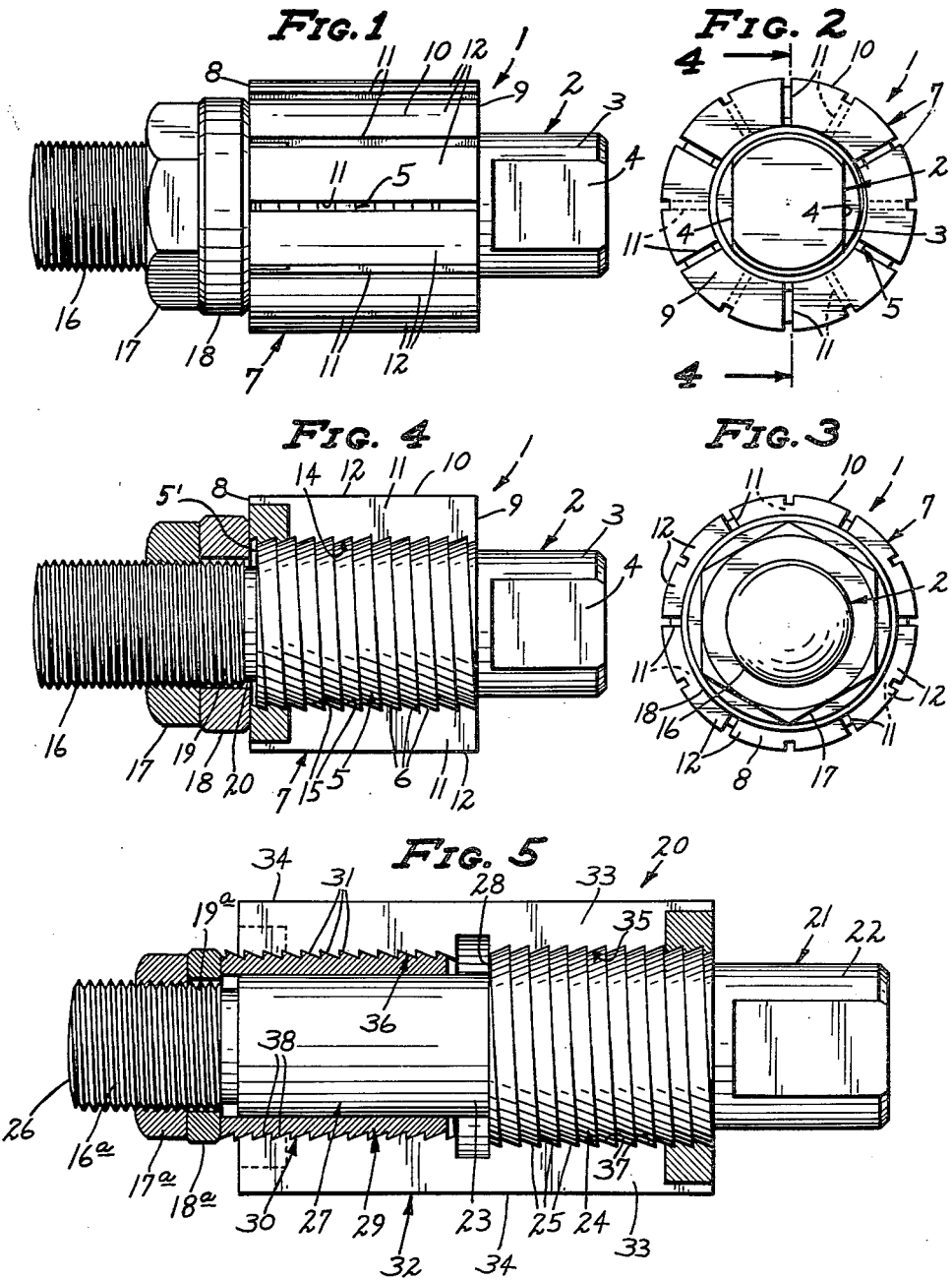
INVENTOR.
HAROLD RUEHL
BY
ATTORNEYS

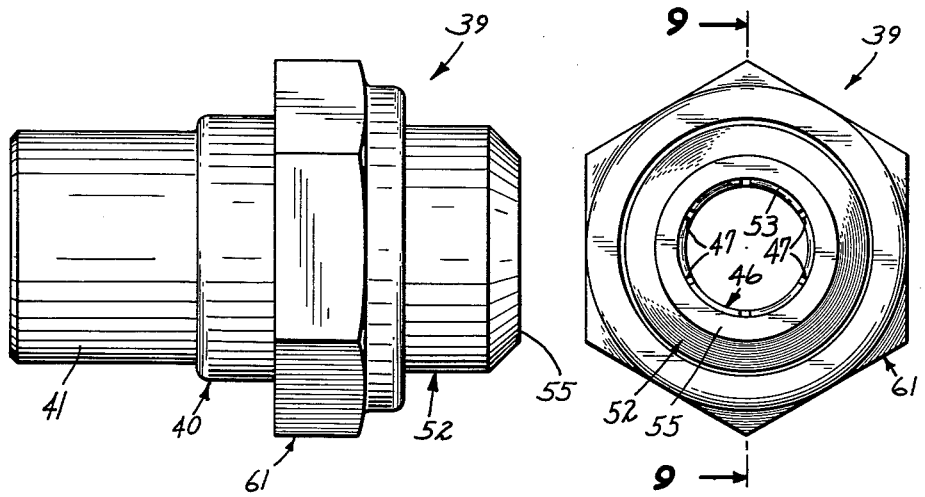
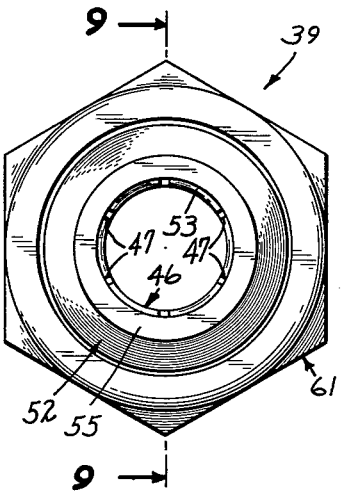
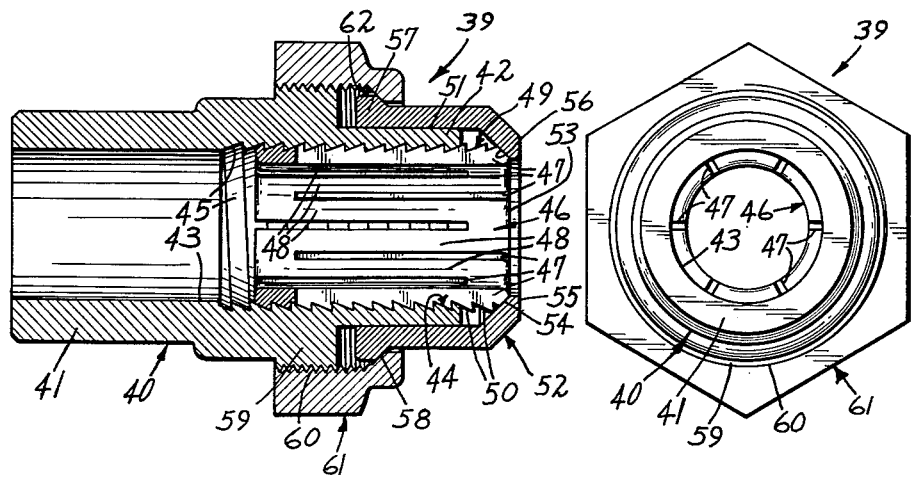
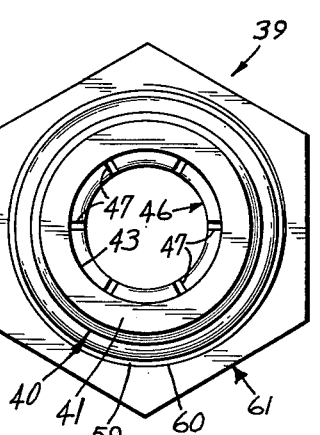

United States Patent Office 3,111,327
Patented Nov. 19, 1963

3,111,327
EXPANSIBLE AND CONTRACTIBLE WORK
PIECE HOLDER
Harold Ruehl, Minneapolis, Minn.
(5623 S. Lake Drive, Cudahy, Wis.)
Filed July 6, 1961, Ser. No. 122,259
15 Claims. (Cl. 279—2)

This invention relates generally to new and useful improvements in work piece holding devices, and more particularly it relates to improvements in work piece holding mandrels and chucks of the type which employ an expansible and contractible collet.

In the machine arts it is quite common to employ a work piece holding device for rigidly supporting a tool or other work piece in performing turning, cutting, grinding, milling and other operations. In this connection, since previously known types of work holding devices of the class described above generally exert their gripping forces at relatively widely spaced and localized points about the engageable surface of the work piece, it has been a particular problem in the art to devise a work piece holding device which would effectively grip the work piece with general uniformity of engagement and pressure about the engageable surface of the work piece. An ancillary difficulty of the previously known prior art devices of the class described above is that it is desiderate that in obtaining general uniformity of engagement, a sacrifice of the ready and easy operation of the device between its gripping and released positions must now be made. Furthermore, it will be appreciated that in many cases the surface of the work piece which is to be gripped by the device is generally of a finished nature, and this factor further dictates the necessity for obtaining general uniformity of engagement and pressure between the work piece and the work holding tool.

As compared with the above stated problems and objections concerning the prior art, this invention has for its object to provide an expansible and contractible work piece holding device which is free from the above mentioned objections, and moreover also possesses further advantages, in particular the advantage of maintaining a high degree of accuracy regarding the alignment of the work piece gripped thereby during operation of the invention. Another object of this invention is the provision of an expansible and contractible work piece holder the convenient assembly of which lends itself to economical production.

Other objects of this invention reside in the provision of a work piece holding device which is simple in construction but strong and durable throughout continued use, and which is highly efficient in providing satisfactory performance of its objects and purposes.

The above and still further objects and advantages of this invention will become apparent from the following detailed specification, appended claims and attached drawings.

Referring to the drawings, wherein like reference characters indicate like parts or elements throughout the several views:

FIG. 1 is a view in elevation of one embodiment of this invention;

FIG. 2 is a view in end elevation as seen from right to left of FIG. 1;

FIG. 3 is a view in end elevation as seen from left to right of FIG. 1;

FIG. 4 is a view in axial section taken on the line 4—4 of FIG. 2, some parts being shown in elevation;

FIG. 5 is a view similar to FIG. 4, but showing a modified embodiment of this invention;

FIG. 6 is a view in elevation of another modified embodiment of this invention;

FIG. 7 is a view in end elevation as seen from right to left of FIG. 6;

FIG. 8 is a view in end elevation as seen from left to right of FIG. 6; and

FIG. 9 is a view in axial section taken on the line 9—9 of FIG. 7.

Referring with greater particularity to the embodiment of my invention shown in FIGS. 1–4, an expansible mandrel for holding a work piece, not shown, of the type having a generally cylindrical bore is shown therein, the expansible mandrel being represented in its entirety by the reference numeral 1. The expansible mandrel 1 comprises an elongated body member of spindle, represented generally by the reference numeral 2, the same having one end portion 3 thereof adapted to be retained by rotary power means, not shown, such as the driving head of a lathe or drill press. For this purpose, the said one end portion 3 of the spindle 2 is provided with oppositely disposed flat surfaces 4. As shown particularly in FIG. 4, the generally intermediate portion of the spindle 2 defines a screw thread 5 which is of generally uniform diameter throughout its length. The screw thread 5 is specially formed so that one side thereof is inclined with respect to the axis of the spindle 2 so as to provide a helically extending cam surface 6. Also, the other side of the screw thread 5 is cut so as to extend generally radially of or generally normal to the axis of the spindle 2. The function and purpose of the screw thread 5 will be more particularly set forth hereinafter.

The expansible mandrel 1 further comprises an expansible and contractible collet, represented generally by the reference numeral 7, the same surrounding the spindle 2. Generally speaking, the design of the collet 7 takes a generally conventional form. The opposite ends of the collet 7 are represented by the reference numerals 8, 9 respectively, and the outer generally cylindrically extending surface is represented by the reference numeral 10. The collet 7 is provided with a plurality of circumferentially spaced generally axially extending slots 11, alternate ones of which extend inwardly from the opposite ends 8, 9 of the collet 7 to divide the collet into a plurality of circumferentially spaced generally axially extended gripping elements 12. The bore of the collet 7 is provided with screw threads 14 which correspond to and are generally the reverse of the screw thread 5 of the spindle 2. Also, the screw threads 14 define helically extending cam surface portions 15 which engage the cam surface 6 of the screw thread 5.

Means is provided in connection with the expansible mandrel 1 for imparting movement to the collet 7 in a generally straight axial direction relative to the spindle 2 and in the direction, relative to the axis of the spindle 2, of outward inclination of the screw thread 5 of the spindle 2. As disclosed, such means comprises a screw threaded other end portion 16 of the spindle 2, and a nut 17 carried by said threaded other end portion 16. Interposed between the nut 17 and the end 8 of the collet 7 is a thrust ring 18, which is positioned for sliding engagement with the threaded portion 19 of the spindle 2. The spindle 2 intermediate the screw thread 5 thereof and the threaded portion 19 thereof is provided with an annular groove 20 so as to permit free axial movement of the thrust ring 18 and engagement thereof with the collet 7. Thus, it will be seen that the nut 17 is adapted to apply a generally axially directed force to the end 8 of the collet 7 and upon rotation of the nut 17, the same imparts movement to the collet 7 in a generally straight axial direction relative to the spindle 2 and in the direction, relative to the axis of the spindle 2, of outward inclination of the screw thread 5 of the spindle 2. Thereupon, according to the design of my invention and the mutual engagement of the screw thread 5 of the spindle 2 with the screw threads 14 of the collet 7, the cam surface portions 15 of the collet 7 cooperate with the cam surface 6 of the screw thread 5 of the spindle 2 whereby to impart radial expansion to the gripping elements 12 of the collet 7 so that the generally cylindrically extending outer surface 10 of the collet 7 will rigidly and uniformly grip the bore of the work piece for which the expansible mandrel is designed. As shown particularly in FIG. 4, the spindle 2 and collet 7 may be positioned relative to one another so that there exists a space between the radially extending spindle surface 5' and the thrust ring 20 so as to permit the above-described relative axial movement only for a distance less than the axial width of the cam surface 6 for one convolution of the thread 5 and until engagement is made between the spindle surface 5' and the thrust ring 20. This provides limit means for the axial movement described above. Of course, it will be appreciated that the unique construction and operation of the expansible mandrel 1 may be embodied in other constructions of this invention, some embodiments of which will be more particularly described hereinafter.

Referring to FIG. 5, a modified form of my novel expansible mandrel is shown therein, the same being represented in its entirety by the reference numeral 20. The modified expansible mandrel 20 of FIG. 5 comprises an elongated spindle 21 having its one end portion 22 adapted to be retained by rotary power means, not shown. The spindle 21 defines intermediate its generally transversely extending center line, shown at 23, and said one end portion 22 thereof a screw thread 24, which corresponds generally to the screw thread 5 of the first above described embodiment of my invention. That is, the screw thread 24 is formed to be of generally uniform diameter throughout its length, and has its one side inclined with respect to the axis of the spindle 21 so as to provide a helically extending cam surface 25, the other side of the screw thread 21 extending generally radially of or normal to the axis of the spindle 21. The spindle 21 further defines intermediate the screw thread 24 thereof and its other end portion 26 a radially reduced generally cylindrical outer surface portion 27. It is noted that the generally cylindrical outer surface portion 27 of the spindle 21 is separated from the screw thread 24 thereof by a generally radially extending abutment 28. A generally cylindrical expander sleeve 29 is adapted to fit over the cylindrical outer surface portion 27 of the spindle 21 and engage the same for generally axially directed sliding movements with respect thereto. The outer longitudinal surface of the expander sleeve 29 defines a screw thread 30 which is of generally uniform diameter throughout its length and which is generally axially aligned with the screw thread 24 of the spindle 21. One side of the screw thread 30 of the expander sleeve 29 is inclined with respect to the axis of the expander sleeve 29 at an angle generally equal to the angle of inclination of the screw thread 24 of the spindle 21 and in a direction generally opposite thereto, whereby to provide a helically extending cam surface 31. The other side of the screw thread 30 of the expander sleeve 29 extends generally radially of and generally normal to the axis of the expander sleeve 29, the form of the screw thread 30 therefore being similar to the form of the screw thread 24 of the spindle 21.

An expansible and contractible collet, represented generally by the reference numeral 32, generally concentrically surrounds the spindle 21 and the expander sleeve 29. The collet 32 has a plurality of circumferentially spaced generally axially extending slots 33, alternate ones of the slots 33 extending inwardly from the opposite ends of the collet 32 so as to divide the collet 32 into a plurality of circumferentially spaced generally axially extended gripping elements 34. The bore of the portion of the collet 32 adjacent the screw thread 24 of the spindle 21 is provided with screw thread 35 which correspond to the screw thread 24 of said spindle 21, and the bore of the portion of the sollet 32 which is adjacent the screw thread 30 of the expander sleeve 29 is provided with screw threads 36 which correspond to said screw thread 30 of said expander sleeve 29, this being particularly shown in FIG. 5. The screw threads 35 define helically extending cam surface portions 37 which engage the adjacent cam surface 25 of the screw thread 24 of the spindle 21, and the screw threads 36 of the collet 32 define cam surface portions 38 which engage the adjacent cam surface 31 of the expander sleeve 29.

Means is provided for imparting movement to the expander sleeve 29 relative to the spindle 21 and the collet 32 in a generally straight axial direction relative to the spindle 21. As disclosed, such means corresponds to like structure of the first above described embodiment of my invention, the same comprising a screw threaded other end portion 16a of the spindle 21 and a nut 17a carried by the screw threaded other end portion 16a. Interposed between the nut 17a and the outer end of the expander sleeve 29 is a thrust ring 18a which is positioned for sliding engagement with the threaded portion 19a of the spindle 21. Thus, it will be seen that the nut 17a is adapted to apply a generally axially directed force to the outer end of the expander sleeve 29, said force being in the direction, relative to the axis of the spindle 21, of outward inclination of the screw thread 24 of the spindle 21, whereby the cam surface 25 of the screw thread 24 of the spindle 21 cooperates with the cam surface portions 37 of the screw threads 35 of the collet 32, and the cam surface 31 of the screw thread 30 of the expander sleeve 29 cooperates with the cam surface portions 38 of the screw threads 36 of the collet 32, so as to impart radial expansion to the gripping elements 34 of the collet 32. In light of the above specific description of this embodiment of my invention shown in FIG. 5, further description of the function and operation thereof is thought to be unnecessary, especially in view of the detailed description of the first above described embodiment of my invention.

This invention may be embodied with relatively equal effectiveness in a chuck construction, as well as the above described mandrel embodiments thereof, and therefore one form of a chuck constructed in accordance with this invention is disclosed herein and will be described hereinafter. Although this invention may be generally referred to as clamping means, such term sometimes appearing herein, the following description refers to the embodiment of my invention shown in FIGS. 6–9. The chuck of this embodiment is represented in its entirety by the reference numeral 39, the same comprising an elongated body member, represented generally by the reference numeral 40. One end portion 41 of the elongated body member 40 is adapted to be retained by rotary power means, not shown. The other end portion 42 of the body member 40 is provided with an axially opening bore 43 whereby the said other end portion 42 of the body member 40 is constructed to be generally tubular in form, it being understood that the bore 43 may extend completely axially through the body member 40. The bore 43 of said tubular other end portion 42 of the body member 40 defines a screw thread 44, which is of generally uniform diameter throughout its length, and one side of which is inclined relative to the axis of the body member 40 so as to provide a helically extending cam surface 45. The other side of the screw thread 44 extends generally radially of and generally normal to the axis of the body member 40.

An expansible and contractible collet, represented generally by the reference numeral 46, is disposed generally concentrically within the tubular other end portion 42 of the elongated body member 40. The collet 46, in a construction similar to the collets 7 and 32 of the above described embodiments of my invention, is provided with a plurality of circumferentially spaced generally axially extending slots 47, alternate ones of the slots 47 extending inwardly from the opposite ends of the collet 46 so as to divide the collet 46 into a plurality of circumferentially spaced generally axially extended gripping elements 48. Also, the outer generally longitudinal surface of the collet 46 defines screw threads 49 which correspond to the screw thread 44 of the body member 40, the screw threads 49 having helically extending cam surface portions 50 which engage the cam surface 45 of the screw thread 44 of the body member 40.

Further in accordance with this embodiment of my invention, the body member 40 defines adjacent the tubular other end portion 42 thereof a generally cylindrical outer surface 51. A generally cylindrical sleeve, represented by the reference numeral 52, is adapted to fit over said cylindrical outer surface 51 of the body member 40 and engage the same for generally axially directed sliding movements with respect thereto.

As is true with the above described embodiments of this invention, the chuck 39 is provided with means for imparting movement to the collet 46 thereof in a generally straight axial direction relative to the body member 40 thereof so as to impart generally radially contraction to the gripping elements 48 of the collet 46. Such means is provided by the following portion of this embodiment of my invention. The outer end portion 53 of the collet 46 normally projects a short distance in a generally axially outward direction from the other end portion 42 of the elongated body member 40, and the same defines a generally conical exterior end bearing surface 54, which is formed so that the apex thereof is generally axially outwardly from the collet 46. The outer end portion 55 of the sleeve 52 defines a radially inwardly extending generally conical interior bearing surface 56, which is complementary with and is adapted to engage the generally conical exterior bearing surface 54 of the outer end portion 53 of the collet 46. Also, the inner end portion 57 of the sleeve 52 has a radially outwardly extending generally conical exterior abutment 58, the purpose of which will hereinafter appear. Referring to FIG. 9, a generally intermediate diametrically enlarged portion 59 of the body member 40 is screw threaded, as at 60, and a threaded bushing 61 is carried by and threadably received thereon. The bushing 61 has a radially inwardly extending generally conical interior abutment 58 of the sleeve 52 and upon rotation of the bushing 61 to impart sliding movement to the sleeve 52 so that the generally conical interior bearing surface 56 of the sleeve 52, upon engaging the generally conical exterior end bearing surface 54 of the outer end portion 53 of the collet 46, imparts movement to the collet 46 in a generally straight axial direction relative to the body member 40 and in the direction, relative to the axis of the body member 40, of inward inclination of the screw thread 44 of the body member 40. It will be obvious that upon said movement of the collet 46, the cam surface 45 of the screw thread 44 of the body member 40 cooperates with the cam surface portions 50 of the screw threads 49 of the collet 46 so as to impart radial contraction to the gripping elements 48 of said collet 46.

It should be apparent that the novel construction and design of this invention, including the combination of the cam surface defining screw threads of the above described embodiments thereof, results in the provision of clamping means, such as the expansible mandrels 1, 20 and the chuck 39, characterized by uniformity of engagement and pressure with the engaged surface of the work piece to such a degree heretofore unobtainable. This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. Clamping means for holding a work piece of the type having a generally cylindrical surface to be gripped, said clamping means comprising an elongated body member having one end portion adapted to be retained by rotary power means, the generally intermediate portion of said body member defining a screw thread of generally uniform diameter throughout its length, one side of said screw thread being inclined relative to the axis of said body member to provide a helically extending cam surface, an expansible and contractible collet disposed in generally telescopic relationship with said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw thread of said body member and defining helically extending cam surface portions which engage the cam surface of said body member, and means carried by said body member for imparting movement to said collet in a generally straight axial direction relative to said body member and in the direction, relative to said axis, of outward inclination of said screw thread of said body member, whereby the cam surfaces of said body member and collet cooperate to impart radial displacement to said gripping element of said collet.

2. Clamping means for holding a work piece of the type having a generally cylindrical surface to be gripped, said clamping means comprising an elongated body member having one end portion adapted to be retained by rotary power means, the generally intermediate portion of said body member defining a screw thread of generally uniform diameter throughout its length, one side of said screw thread being inclined relative to the axis of said body member to provide a helically extending cam surface and the other side of said screw thread extending generally radially of the axis of said body member, an expansible and contractible collet disposed in generally telescopic relationship with said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw thread of said body member and defining helically extending cam surface portions which engage the cam surface of said body member, and means carried by said body member for imparting movement to said collet in a generally straight axial direction relative to said body member and in the direction, relative to said axis, of outward inclination of said screw thread of said body member, whereby the cam surfaces of said body member and collet cooperate to impart radial displacement to said gripping elements of said collet.

3. An expansible mandrel for holding a work piece of the type having a generally cylindrical bore, said mandrel comprising a spindle having one end portion thereof adapted to be retained by rotary power means, a generally intermediate portion of said spindle defining a screw thread of generally uniform diameter throughout its length, one side of said screw thread being inclined with respect to the axis of said spindle to provide a helically extending cam surface, an expansible and contractible collet surrounding said spindle, said collet having a plurality of circumferentially spaced generally axially extending slots alternate ones of which extend inwardly from the opposite ends of said collet to divide said collet into a plurality of circumferentially spaced generally axially extended gripping elements, the bore of said collet being provided with screw threads corresponding to the screw thread of said generally intermediate portion of said spindle and defining helically extending cam surface portions which engage the cam surface of said spindle, and means carried by said spindle for imparting movement to said collet in a generally straight axial direction relative to said spindle and in the direction, relative to said axis, of outward inclination of said screw thread of said spindle, whereby the cam surfaces of said spindle and collet cooperate to impart radial expansion to said gripping elements of said collet.

4. An expansible mandrel for holding a work piece of the type having a generally cylindrical bore, said mandrel comprising a spindle having one end portion thereof adapted to be retained by rotary power means, the generally intermediate portion of said spindle defining a screw thread of generally uniform diameter throughout its length, one side of said screw thread being inclined with respect to the axis of said spindle to provide a helically extending cam surface and the other side of said screw thread extending generally radially of the axis of said spindle, an expansible and contractible collet surrounding said spindle, said collet having a plurality of circumferentially spaced generally axially extended gripping elements, the bore of said collet being provided with screw threads corresponding to the screw thread of said generally intermediate portion of said spindle and defining helically extending cam surface portions which engage the cam surface of said spindle, and means carried by the other end portion of said spindle for imparting movement to said collet in a generally straight axial direction relative to said spindle and in the direction, relative to said axis, of outward inclination of said screw thread of said spindle, whereby the cam surfaces of said spindle and collet cooperate to impart radial expansion to said gripping elements of said collet.

5. An expansible mandrel for holding a work piece of the type having a generally cylindrical bore, said mandrel comprising a spindle having one end portion thereof adapted to be retained by rotary power means, the generally intermediate portion of said spindle defining a screw thread of generally uniform diameter throughout its length, one side of said screw thread being inclined with respect to the axis of said spindle to provide a helically extending cam surface and the other side of said screw thread extending generally radially of the axis of said spindle, an expansible and contractible collet surrounding said spindle, said collet having a plurality of circumferentially spaced generally axially extending slots alternate ones of which extend inwardly from the opposite ends of said collet to divide said collet into a plurality of circumferentially spaced generally axially extended gripping elements, the bore of said collet being provided with screw threads corresponding to the screw thread of said generally intermediate portion of said spindle and defining helically extending cam surface portions which engage the cam surface of said spindle, the other end portion of said spindle being screw threaded, and a nut carried by said threaded other end portion of said spindle and adapted to apply a generally axially directed force to an end surface of said collet and upon rotation of said nut to impart movement to said collet in a generally straight axial direction relative to said spindle and in the direction, relative to the spindle axis, of outward inclination of said screw thread of said spindle, whereby the cam surfaces of said spindle and said collet cooperate to impart radial expansion to said gripping elements of said collet.

6. An expansible mandrel for holding a work piece of the type having a generally cylindrical bore, said mandrel comprising a spindle having one end portion thereof adapted to be retained by rotary power means, said spindle defining intermediate its generally transversely extending center line and said one end portion thereof a screw thread of generally uniform diameter throughout its length, one side of said screw thread being inclined with respect to the axis of said spindle to provide a helically extending cam surface, said spindle defining intermediate said screw thread thereof and its other end portion a radially reduced generally cylindrical outer surface portion, a generally cylindrical expander sleeve adapted to fit over said cylindrical outer surface portion of said spindle and engage the same for generally axially directed sliding movements with respect thereto, the outer longitudinal surface of said expander sleeve defining a screw thread of generally uniform diameter throughout its length, one side of the last said screw thread being inclined with respect to the axis of said expander sleeve and said spindle at an angle generally equal to the angle of inclination of the screw thread of said spindle and in a direction generally opposite thereto whereby to provide a helically extending cam surface, an expansible and contractible collet generally concentrically surrounding said spindle and said expander sleeve, said collet having a plurality of circumferentially spaced generally axially extending slots alternate ones of which extend inwardly from the opposite ends of said collet to divide said collet into a plurality of circumferentially spaced generally axially extended gripping elements, the bore of the portion of said collet adjacent said screw thread of said spindle being provided with screw threads which correspond to said screw thread of said spindle and the bore of the portion of said collet adjacent said screw thread of said expander sleeve being provided with screw threads which correspond to said screw thread of said expander sleeve, said screw threads of said collet respectively defining helically extending cam surface portions which respectively engage the adjacent cam surface of said spindle and the adjacent cam surface of said expander sleeve, and means carried by said spindle for imparting movement to said expander sleeve relative to said spindle and relative to said collet in a generally straight axial direction relative to said spindle and in the direction, relative to said spindle axis, of outward inclination of said screw thread of said spindle, whereby the cam surfaces of said spindle and said expander sleeve cooperate with the cam surface portion of said collet to impart radial expansion to said gripping elements of said collet.

7. An expansible mandrel for holding a work piece of the type having a generally cylindrical bore, said mandrel comprising a spindle having one end portion thereof adapted to be retained by rotary power means, said spindle defining intermediate its generally transversely extending center line and said one end portion thereof a screw thread of generally uniform diameter throughout its length, one side of said screw thread being inclined with respect to the axis of said spindle to provide a helically extending cam surface and the other side of said screw thread extending generally radially of the axis of said spindle, said spindle defining intermediate said screw thread thereof and its other end portion a radially reduced generally cylindrical outer surface portion, a generally cylindrical expander sleeve adapted to fit over said cylindrical outer surface portion of said spindle and engage the same for generally axially directed sliding movements with respect thereto, the outer longitudinal surface of said expander sleeve defining a screw thread of generally uniform diameter throughout its length, one side of the last said screw thread being inclined with respect to the axis of said expander sleeve and said spindle at an angle generally equal to the angle of inclination of the screw thread of said spindle and in a direction generally opposite thereto whereby to provide a helically extending cam surface and the other side of said screw thread of said expander sleeve extending generally radially of the axis of said expander sleeve, an expansible and contractible collet generally concentrically surrounding said spindle and said expander sleeve, said collet having a plurality of circumferentially spaced generally axially extending slots alternate ones of which extend inwardly from the opposite ends of the collet to divide said collet into a plurality of circumferentially spaced generally axially extended gripping elements, the bore of the portion of said collet adjacent said screw thread of said spindle being provided with screw threads which correspond to said screw thread of said spindle and the bore of the portion of said collet adjacent said screw thread of said expander sleeve being provided with screw threads which correspond to said screw thread of said expander sleeve, said screw threads of said collet respectively defining helically extending cam surface portions which respectively engage the adjacent cam surface of said spindle and the adjacent cam surface of said expander sleeve, and means carried by said spindle for imparting movement to said expander sleeve relative to said spindle and relative to said collet in a generally straight axial direction relative to said spindle and in the direction, relative to said spindle axis, of outward inclination of said screw thread of said spindle, whereby the cam surfaces of said spindle and said expander sleeve cooperate with the cam surface portions of said collet to impart radial expansion to said gripping elements of said collet.

8. An expansible mandrel for holding a work piece of the type having a generally cylindrical bore, said mandrel comprising a spindle having one end portion adapted to be retained by rotary power means, said spindle defining intermediate its generally transversely extending center line and said one end portion thereof a screw thread of generally uniform diameter throughout its length, one side of said screw thread being inclined with respect to the axis of said spindle to provide a helically extending cam surface and the other side of said screw thread extending generally radially of the axis of said spindle, said spindle defining intermediate said screw thread thereof and its other end portion a radially reduced generally cylindrical outer surface portion, a generally cylindrical expander sleeve adapted to fit over said cylindrical outer surface portion of said spindle and engage the same for generally axially directed sliding movements with respect thereto, the outer longitudinal surface of said expander sleeve defining a screw thread of generally uniform diameter throughout its length, one side of the last said screw thread being inclined with respect to the axis of said expander sleeve and said spindle at an angle generally equal to the angle of inclination of the screw thread of said spindle and in a direction generally opposite thereto whereby to provide a helically extending cam surface and the other side of said screw thread of said expander sleeve extending radially of the axis of said expander sleeve, an expansible and contractible collet generally concentrically surrounding said spindle and said expander sleeve, said collet having a plurality of circumferentially spaced generally axially extending slots alternate ones of which extend inwardly from the opposite ends of said collet to divide said collet into a plurality of circumferentially spaced generally axially extended gripping elements, the bore of the portion of said collet adjacent said screw thread of said spindle being provided with screw threads which correspond to said screw thread of said spindle and the bore of the portion of said collet adjacent said screw thread of said expander sleeve being provided with screw threads which correspond to said screw thread of said expander sleeve, said screw threads of said collet respectively defining helically extending cam surface portions which respectively engage the adjacent cam surface of said spindle and the adjacent cam surface of said expander sleeve, the other end portion of said spindle being screw threaded, and a nut carried by said threaded other end portion of said spindle and adapted to apply a generally axially directed force to the outer end of said expander sleeve and upon rotation of said nut to impart movement to said expander sleeve in a generally straight axial direction relative to said spindle and in the direction, relative to the spindle axis, of outward inclination of said screw thread of said spindle, whereby the cam surfaces of said spindle and said expander sleeve cooperate with the cam surface portions of said collet to impart radial expansion to said gripping elements of said collet.

9. A chuck comprising an elongated body member having one end portion thereof adapted to be retained by rotary power means, the other end portion of said body member having an axially opening bore whereby said other end portion is generally tubular in form, the bore of said tubular other end portion defining a screw thread of generally uniform diameter throughout its length, one side of said screw thread being inclined relative to the axis of said body member to provide a helically extending cam surface, an expansible and contractible collet disposed generally concentrically within said tubular other end portion of said body member, said collet having a plurality of circumferentially spaced generally axially extending slots alternate ones of which extend inwardly from opposite ends of said collet to divide said collet into a plurality of circumferentially spaced generally axially extended gripping elements, the outer longitudinal surface of said collet being provided with screw threads corresponding to the screw thread of said tubular other end portion of said body member and defining helically extending cam surface portions which engage the cam surface of said tubular other end portion of said body member, and means carried by said body member for imparting movement to said collet in a generally straight axial direction relative to said body member and in the direction, relative to said axis, of inward inclination of said screw thread of said body member, whereby the cam surfaces of said body member and collet cooperate to impart radial contraction to said gripping elements of said collet.

10. A chuck comprising an elongated body member having one end portion thereof adapted to be retained by rotary power means, the other end portion of said body member having an axially opening bore whereby said other end portion is generally tubular in form, the bore of said tubular other end portion defining a screw thread of generally uniform diameter throughout its length, one side of said screw thread being inclined relative to the axis of said body member to provide a helically extending cam surface and the other side of said screw thread extending generally radially of the axis of said body member, an expansible and contractible collet disposed generally concentrically within said tubular other end portion of said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw thread of said tubular other end portion of said body member and defining helically extending cam surface portions which engage the cam surface of said tubular other end portion of said body member, and means carried by said body member for imparting movements to said collet in a generally straight axial direction relative to said body member and in the direction, relative to said axis, of inward inclination of said screw thread of said body member, whereby the cam surfaces of said body member and said collet cooperate to impart radial contraction to said gripping elements of said collet.

11. A chuck comprising an elongated body member having one end portion thereof adapted to be retained by rotary power means, the other end portion of said body member having an axially opening bore whereby said other end portion is generally tubular in form, the bore of said tubular other end portion defining a screw thread of generally uniform diameter throughout its length, one side of said screw thread being inclined relative to the axis of said body member to provide a helically extending cam surface and the other side of said screw thread extending generally radially of the axis of said body member, an expansible and contractible collet disposed generally concentrically within said tubular other end portion of said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw thread of said tubular other end portion of said body member and defining helically extending cam surface portions which engage the cam surface of said tubular other end portion of said body member, said body member defining adjacent said tubular other end portion thereof a generally cylindrical outer surface, a generally cylindrical sleeve adapted to fit over said cylindrical outer surface of said body member and engage the same for generally axially directed sliding movements with respect thereto, the outer end of said sleeve defining a radially inwardly extending end portion of lesser diameter than the outer diameter of said collet and adapted to engage the outer end of said collet, and means carried by said body member for imparting sliding movement to said sleeve so that the radially reduced end portion thereof upon engaging the outer end of said collet imparts movement to said collet in a generally straight axial direction relative to said body member and in the direction, relative to said axis, of inward inclination of said screw thread of said body member, whereby the cam surfaces of said tubular other end portion of said body member and said collet cooperate to impart radial contraction to said gripping elements of said collet.

12. A chuck comprising an elongated body member having one end portion thereof adapted to be retained by rotary power means, the other end portion of said body member having an axially opening bore whereby said other end portion is generally tubular in form, the bore of said tubular other end portion defining a screw thread of generally uniform diameter throughout its length, one side of said screw thread being inclined relative to the axis of said body member to provide a helically extending cam surface and the other side of said screw thread extending generally radially of the axis of said body member, an expansible and contractible collet disposed generally concentrically within said tubular other end portion of said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw threads of said tubular other end portion of said body member and defining helically extending cam surface portions which engage the cam surface of said tubular other end portion of said body member, said body member defining adjacent said tubular other end portion thereof a generally cylindrical outer surface, a generally cylindrical sleeve adapted to fit over said cylindrical outer surface of said body member and engage the same for generally axially directed sliding movements with respect thereto, the outer end of said sleeve defining a radially inwardly extending end portion of lesser diameter than the outer diameter of said collet and adapted to engage the outer end of said collet, a generally intermediate portion of the outer surface of said body member being screw threaded, and a threaded bushing carried by said threaded intermediate portion of said body member and adapted to engage said sleeve and upon rotation of said bushing to impart sliding movement to said sleeve so that the radially reduced end portion thereof upon engaging the outer end of said collet imparts movement to said collet in a generally straight axial direction relative to said body member and in the direction, relative to said axis, of inward inclination of said screw thread of said body member, whereby the cam surfaces of said tubular other end portion of said body member and said collet cooperate to impart radial contraction to said gripping elements.

13. A chuck comprising an elongated body member having one end portion thereof adapted to be retained by rotary power means, the other end portion of said body member having an axially opening bore whereby said other end portion is generally tubular in form, the bore of said tubular other end portion defining a screw thread of generally uniform diameter throughout its length, one side of said screw thread being inclined relative to the axis of said body member to provide a helically extending cam surface and the other side of said screw thread extending generally radially of the axis of said body member, an expansible and contractible collet disposed generally concentrically within said tubular other end portion of said body member, said collet having a plurality of circumferentially spaced generally axially extending slots alternate ones of which extend inwardly from opposite ends of said collet to divide said collet into a plurality of circumferentially spaced generally axially extended gripping elements, the outer longitudinal surface of said collet being provided with screw threads corresponding to the screw thread of said tubular other end portion of said body member and defining helically extending cam surface portions which engage the cam surface of said tubular other end portion of said body member, said body member defining adjacent said tubular other end portion thereof a generally cylindrical outer surface, a generally cylindrical sleeve adapted to fit over said cylindrical outer surface of said body member and engage the same for generally axially directed sliding movements with respect thereto, the outer end portion of said collet normally projecting a short distance in an axially outward direction from said other end portion of said body member and defining a generally conical exterior end bearing surface the apex of which is axially outward from said collet, the outer end portion of said sleeve defining a radially inwardly extending generally conical interior bearing surface which is complementary with and is adapted to engage the generally conical exterior bearing surface of the outer end portion of said collet, the inner end portion of said sleeve defining a radially outwardly extending abutment, a generally intermediate portion of the outer surface of said body member being screw threaded, and a threaded bushing carried by said threaded intermediate portion of said body member, said bushing having a radially inwardly extending abutment surface adapted to engage the abutment of said sleeve and upon rotation of said bushing to impart sliding movement to said sleeve so that the generally conical interior bearing surface thereof upon engaging the generally conical exterior bearing surface of the outer end of said collet imparts movement to said collet in a generally straight axial direction relative to said body member and in the direction relative to said axis, of inward inclination of said screw thread of said body member, whereby the cam surfaces of the tubular other end portion of said body member and said collet cooperate to impart radial contraction to said gripping elements of said collet.

14. Clamping means for holding a work piece of the type having a generally cylindrical surface to be gripped, said clamping means comprising an elongated body member having one end portion adapted to be retained by rotary power means, the generally intermediate portion of said body member defining a screw thread of generally uniform diameter throughout its length, one side of said screw thread being inclined relative to the axis of said body member to provide a helically extending cam surface, an expansible and contractible collet disposed in generally telescopic relationship with said body member, said collet having a plurality of circumferentially spaced generally axially extending slots alternate ones of which extend inwardly from opposite ends of said collet to divide said collet into a plurality of circumferentially spaced generally axially extended gripping elements, said collet being provided with screw threads corresponding to the screw thread of said body member and defining helically extending cam surface portions which engage the cam surface of said body member, means carried by said body member for imparting movement to said collet in a generally straight axial direction relative to said body member and in the direction, relative to said axis, of outward inclination of said screw thread of said body member, whereby the cam surfaces of said body member and collet cooperate to impart radial displacement to said gripping element of said collet, and limit means for limiting the said movement of said collet relative to said body member to a distance less than the axial width of said cam surface for one convolution of said screw thread.

15. An expansible mandrel for holding a work piece of the type having a generally cylindrical bore, said mandrel comprising a spindle having one end portion thereof adapted to be retained by rotary power means, the generally intermediate portion of said spindle defining a screw thread of generally uniform diameter throughout its length, one side of said screw thread being inclined with respect to the axis of said spindle to provide a helically extending cam surface and the other side of said screw thread extending generally radially of the axis of said spindle, an expansible and contractible collet surrounding said spindle, said collet having a plurality of circumferentially spaced generally axially extended gripping elements, the bore of said collet being provided with screw threads corresponding to the screw thread of said generally intermediate portion of said spindle and defining helically extending cam surface portions which engage the cam surface of said spindle, means carried by the other end portion of said spindle for imparting movement to said collet in a generally straight axial direction relative to said spindle and in the direction, relative to said axis, of outward inclination of said screw thread of said spindle, whereby the cam surfaces of said spindle and collet cooperate to impart radial expansion to said gripping elements of said collet, and limit means for limiting the said movement of said collet relative to said spindle to a distance less than the axial width of said cam surface for one convolution of said screw thread.

References Cited in the file of this patent
UNITED STATES PATENTS

| | | |
|---|---|---|
| 2,734,749 | Benjamin | Feb. 14, 1956 |
| 2,755,093 | Peter | July 17, 1956 |
| 2,819,090 | Stenberg | Jan. 7, 1958 |
| 2,859,041 | Sloan | Nov. 4, 1958 |